US011194975B2

(12) United States Patent
Seo et al.

(10) Patent No.: US 11,194,975 B2
(45) Date of Patent: *Dec. 7, 2021

(54) ELECTRONIC DEVICE, USER INPUT APPARATUS CONTROLLING THE SAME, AND CONTROL METHOD THEREOF

(71) Applicant: SAMSUNG ELECTRONICS CO., LTD., Suwon-si (KR)

(72) Inventors: Dae-Won Seo, Jeonju-si (KR); Doh-Hyeong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,344

(22) Filed: Apr. 27, 2020

(65) Prior Publication Data

US 2020/0257863 A1     Aug. 13, 2020

Related U.S. Application Data

(63) Continuation of application No. 15/675,147, filed on Aug. 11, 2017, now Pat. No. 10,671,817, which is a
(Continued)

(30) Foreign Application Priority Data

Dec. 30, 2011    (KR) .......................... 10-2011-0147208

(51) Int. Cl.
*G06K 7/00*    (2006.01)
*H04N 21/81*   (2011.01)
(Continued)

(52) U.S. Cl.
CPC ...... *G06K 7/0008* (2013.01); *H04M 1/72412* (2021.01); *H04N 21/41265* (2020.08);
(Continued)

(58) Field of Classification Search
CPC ............... G06K 7/0008; G06F 9/4416; H04M 1/72412; H04M 1/72406; H04M 1/72427;
(Continued)

(56) References Cited

U.S. PATENT DOCUMENTS 6,006,034 A    12/1999 Heath et al.
6,133,847 A    10/2000 Yang
(Continued)

FOREIGN PATENT DOCUMENTS

CN     101305611 A      11/2008
CN     102185884 A  *   9/2011
(Continued)

OTHER PUBLICATIONS

Communication dated Jun. 29, 2020, issued by the State Intellectual Property Office of P.R. China in Chinese Application No. 201710443726.6.

(Continued)

*Primary Examiner* — Adnan Aziz
(74) *Attorney, Agent, or Firm* — Sughrue Mion, PLLC

(57) ABSTRACT

An electronic device executing an application through communication with a user input apparatus, the electronic device is provided. The electronic device includes: a communication unit that is configured to communicate with the user input apparatus; an information generation unit that generates information about an exclusive controller that controls the application and is executed in the user input apparatus; and a controller that controls the information generation unit to generate the information about the exclusive controller when the electronic device is paired with the user input apparatus, and controls the communication unit to transmit the generated information about the exclusive controller to the user input apparatus.

25 Claims, 7 Drawing Sheets

Related U.S. Application Data continuation of application No. 13/729,924, filed on Dec. 28, 2012, now Pat. No. 9,734,362.

(51) Int. Cl.

| | |
|---|---|
| *H04N 21/436* | (2011.01) |
| *H04N 21/426* | (2011.01) |
| *H04N 21/422* | (2011.01) |
| *H04M 1/725* | (2021.01) |
| *H04N 21/41* | (2011.01) |
| *H04M 1/72412* | (2021.01) |
| *H04M 1/72406* | (2021.01) |
| *H04M 1/72427* | (2021.01) |

(52) U.S. Cl.
CPC ... *H04N 21/4222* (2013.01); *H04N 21/42684* (2013.01); *H04N 21/43615* (2013.01); *H04N 21/8173* (2013.01); *H04N 21/8186* (2013.01); *H04M 1/72406* (2021.01); *H04M 1/72427* (2021.01)

(58) Field of Classification Search
CPC ......... H04N 21/41265; H04N 21/4222; H04N 21/42684; H04N 21/43615; H04N 21/8173; H04N 21/8186; H04Q 9/00; H04W 92/18
See application file for complete search history.

(56) References Cited

U.S. PATENT DOCUMENTS

| | | | |
|---|---|---|---|
| 6,725,260 B1 | 4/2004 | Philyaw | |
| 7,992,187 B2 | 8/2011 | Chiao | |
| 8,015,446 B2 | 9/2011 | Scott et al. | |
| 8,200,868 B1 | 6/2012 | 't Hooft | |
| 8,397,264 B2 | 3/2013 | Ansari et al. | |
| 8,417,797 B2 | 4/2013 | Thoen | |
| 8,433,306 B2 | 4/2013 | Rodriguez | |
| 8,508,401 B1 | 8/2013 | Patel et al. | |
| 8,922,334 B2 | 12/2014 | Hale et al. | |
| 9,704,131 B2* | 7/2017 | Imai ................... | G06Q 10/10 |
| 2003/0141987 A1 | 7/2003 | Hayes | |
| 2003/0156053 A1 | 8/2003 | Wall et al. | |
| 2004/0117632 A1 | 6/2004 | Arling et al. | |
| 2004/0266419 A1 | 12/2004 | Arling et al. | |
| 2005/0076127 A1 | 4/2005 | Wilson et al. | |
| 2005/0210120 A1 | 9/2005 | Yukie et al. | |
| 2005/0235294 A1 | 10/2005 | Kimura et al. | |
| 2007/0050054 A1 | 3/2007 | Sambandam Guruparan et al. | |
| 2007/0290882 A1 | 12/2007 | Consorte et al. | |
| 2008/0115189 A1 | 5/2008 | Lejeune | |
| 2008/0134049 A1 | 6/2008 | Gupta et al. | |
| 2008/0168391 A1 | 7/2008 | Robbin et al. | |
| 2008/0209500 A1 | 8/2008 | Hironaka et al. | |
| 2008/0288993 A1 | 11/2008 | Aghasaryan et al. | |
| 2009/0052863 A1 | 2/2009 | Parmar et al. | |
| 2009/0239587 A1 | 9/2009 | Negron et al. | |
| 2010/0134317 A1 | 6/2010 | Breuil et al. | |
| 2010/0210293 A1 | 8/2010 | Lim et al. | |
| 2011/0066960 A1 | 3/2011 | Suzuki | |
| 2011/0074591 A1 | 3/2011 | Arling et al. | |
| 2011/0105226 A1 | 5/2011 | Perlman | |
| 2011/0115698 A1 | 5/2011 | Chung et al. | |
| 2011/0298596 A1 | 12/2011 | Warrick | |
| 2012/0056823 A1 | 3/2012 | Skog et al. | |
| 2012/0057081 A1 | 3/2012 | Petersson et al. | |
| 2012/0124615 A1 | 5/2012 | Lee | |
| 2012/0147270 A1 | 6/2012 | Kim et al. | |
| 2012/0210268 A1 | 8/2012 | Hilbrink et al. | |
| 2012/0252576 A1* | 10/2012 | Vange ................. | H04N 21/4781 463/31 |
| 2012/0274547 A1 | 11/2012 | Raeber et al. | |
| 2013/0035086 A1 | 2/2013 | Chardon et al. | |
| 2013/0052946 A1 | 2/2013 | Chatterjee et al. | |
| 2013/0086577 A1 | 4/2013 | Nakashima et al. | |
| 2013/0152138 A1 | 6/2013 | Jeong et al. | |
| 2013/0169418 A1 | 7/2013 | Seo et al. | |
| 2013/0271672 A1 | 10/2013 | Chen et al. | |
| 2013/0307785 A1 | 11/2013 | Matsunaga | |
| 2017/0337400 A1 | 11/2017 | Seo et al. | |

FOREIGN PATENT DOCUMENTS

| | | |
|---|---|---|
| CN | 102185884 A | 9/2011 |
| CN | 102665123 A | 9/2012 |
| CN | 103257706 A | 8/2013 |
| KR | 10-2006-0083272 A | 7/2006 |
| KR | 10-2009-0085119 A | 8/2009 |
| KR | 10-2010-0065478 A | 6/2010 |
| KR | 10-2010-0092848 A | 8/2010 |
| KR | 10-2011-0041168 A | 4/2011 |
| KR | 10-2011-0053111 A | 5/2011 |
| KR | 10-2011-0082881 A | 7/2011 |
| WO | 2004/002149 A1 | 12/2003 |
| WO | 2008/093279 A1 | 8/2008 |

OTHER PUBLICATIONS

Communication dated Feb. 1, 2019 issued by the European Patent Office in Counterpart European Application No. 12 198 208.6.
Office Action dated Jul. 26, 2016 received in parent U.S. Appl. No. 13/729,924.
J. Nichols, et al.; "Controlling Home and Office Appliance with Smart Phones"; Journal of IEEE Pervasive Computing; Jul. 2006; pp. 60-67.
Communication dated Aug. 12, 2015, issued by the Korean Intellectual Property Office in counterpart Korean Application No. 10-2011-0147208.
Communication dated Sep. 16, 2019 issued by the European Intellectual Property Office in counterpart European Application No. 19179797.6.
Office Action dated Dec. 9, 2015 received in parent U.S. Appl. No. 13/729,924.
Communication from the Korean Intellectual Property Office dated Mar. 24, 2016 in a counterpart Korean application No. 10-2011-0147208.
Communication dated Apr. 29, 2013, issued by the European Patent Office in counterpart European Patent Application 12198208.6.
Communication dated Jun. 28, 2019 issued by the State Intellectual Property Office of P.R. China in counterpart Chinese Application No. 201710443726.6.
Communication dated Jan. 20, 2020 issued by the State Intellectual Property Office of P.R. China in counterpart Chinese Application No. 201710443726.6.
Office Action dated Jul. 8, 2015 received in parent U.S. Appl. No. 13/729,924.
Communication dated Nov. 9, 2015 issued by the Korean Intellectual Property Office in counterpart Korean Application No. 10-2011-0147208.
Communication dated Apr. 23, 2015 issued by the European Patent Office in counterpart Application No. 12 198 208.6.
Communication dated May 29, 2018, issued by the European Patent Office in counterpart European Application No. 12198208.6.
Notice of Allowance dated Apr. 7, 2017 received in parent U.S. Appl. No. 13/729,924.
Office Action dated Dec. 16, 2014 received in parent U.S. Appl. No. 13/729,924.
Communication dated Nov. 15, 2016 issued by the State Intellectual Property Office of P.R. China in counterpart Chinese Application No. 201210579269.0.
Office Action dated Nov. 11, 2017 received in parent U.S. Appl. No. 15/675,147.
Office Action dated Apr. 19, 2019 received in parent U.S. Appl. No. 15/675,147.
Office Action dated Nov. 14, 2019 received in parent U.S. Appl. No. 15/675,147.

(56) References Cited

OTHER PUBLICATIONS

Notice of Allowance dated Jan. 27, 2020 received in parent U.S. Appl. No. 15/675,147.
Communication dated Apr. 21, 2021, issued by the European Patent Office in European Application No. 19179797.6.

* cited by examiner

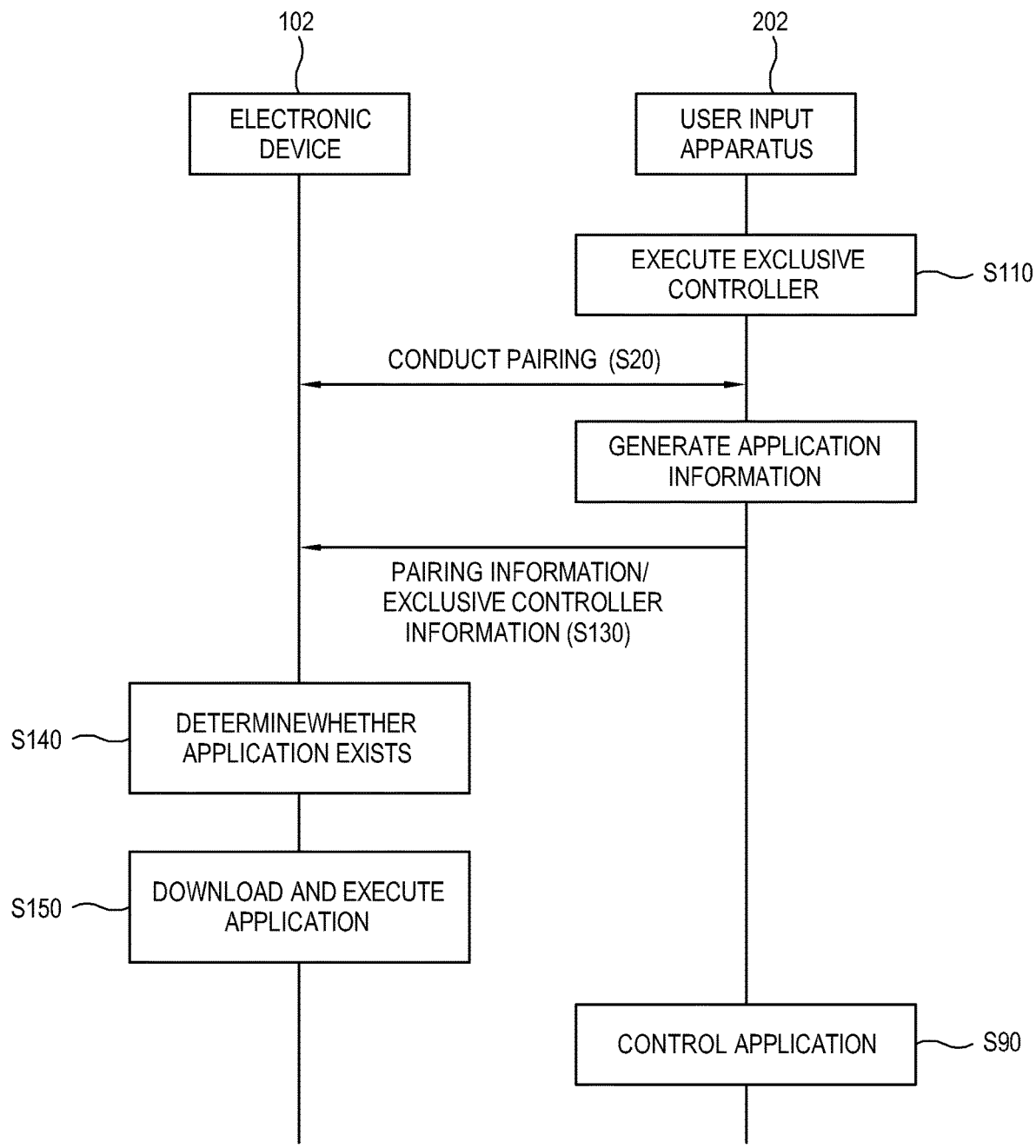

ELECTRONIC DEVICE, USER INPUT APPARATUS CONTROLLING THE SAME, AND CONTROL METHOD THEREOF

CROSS-REFERENCE TO RELATED APPLICATION

This is a continuation of U.S. application Ser. No. 15/675,147 filed on Aug. 11, 2017, which is a continuation of U.S. application Ser. No. 13/729,924 filed on Dec. 28, 2012 (now U.S. Pat. No. 9,734,362), which claims priority from Korean Patent Application No. 10-2011-0147208, filed on Dec. 30, 2011 in the Korean Intellectual Property Office, the disclosures of which are incorporated herein by reference.

BACKGROUND

1. Field

Apparatuses and methods consistent with exemplary embodiments relate to an electronic device, a user input apparatus controlling the same, and a control method thereof.

2. Description of the Related Art

Recent developments in digital equipment enable communication between various electronic devices, thereby enabling a variety of contents to be transmitted and received.

Also, such technological advancements result in digital convergence and are applied to diverse areas regardless of communication modes and methods between electronic devices and types of contents. Furthermore, with vigorous communication between consumer electronics, there is an increasing demand of users for various display environments.

Recently, as the game industry is expanded and various contents are developed, a controller for controlling particular software is developed as an independent program. Accordingly, it is important to provide an interface suitable and convenient for a user.

SUMMARY

One or more exemplary embodiments provide an electronic device which is configured to execute an exclusive controller controlling an application without additional selection by a user, a user input apparatus controlling the same, and a control method thereof.

Further, one or more exemplary embodiments provide an electronic device which is configured to update and install an exclusive controller controlling an application without additional selection by a user, a user input apparatus controlling the same, and a control method thereof.

In addition, one or more exemplary embodiments provide an electronic device which is configured to install and execute an application controlled by an exclusive controller controlling without additional selection by a user, a user input apparatus controlling the same, and a control method thereof.

According to an aspect of an exemplary embodiment, there is provided an electronic device including: a communication unit communicating that is configured to communicate with a user input apparatus; an information generation unit that generates information about an exclusive controller that is executed in the user input apparatus and controls an application executed in the electronic device; and a controller that controls the information generation unit to generate the information about the exclusive controller when the electronic device is paired with the user input apparatus, and controls the communication unit to transmit the generated information about the exclusive controller to the user input apparatus.

The information about the exclusive controller may include information about whether the exclusive controller exists, an application identifier (ID), information about a version of the application, and information about a source from which to download the exclusive controller.

The controller may further transmit information about pairing with the user input apparatus to the user input apparatus.

According to an aspect of another exemplary embodiment, there is provided a user input apparatus including: a communication unit that is configured to communicate with an electronic device that executes an application; and a controller that receives through the communication unit information about an exclusive controller that controls the application from the electronic device, and automatically executes the exclusive controller based on the information about the exclusive controller.

The user input apparatus may further include a basic controller that controls the application, wherein the controller conducts pairing with the electronic device through the basic controller, determines whether the exclusive controller exists in the user input apparatus when the information about the exclusive controller is received, and switches the basic controller to the exclusive controller to control the application if it is determined that the exclusive controller exists.

The information about the exclusive controller may include information about whether the exclusive controller exists, an application ID, information about a version of the application, and information about a source from which to download the exclusive controller, and the controller determines whether the exclusive controller exists in the user input apparatus, and downloads the exclusive controller based on the information about the source if it is determined the exclusive controller does not exist.

The information about the exclusive controller may include information about whether the exclusive controller exists, an application ID, information about a version of the application, and information about a source from which to download the exclusive controller, and the controller updates the exclusive controller based on the application ID, the information about the version of the application, and the information about the source.

The communication unit may receive information about pairing with the user input apparatus, and the controller conducts pairing with the electronic device using the information about the pairing when executing the exclusive controller.

According to an aspect of another exemplary embodiment, there is provided a control method of a user input apparatus, the control method including: pairing the user input apparatus with an electronic device through a basic controller of the user input apparatus; receiving information about an exclusive controller controlling an application executable by the electronic device from the electronic device; and automatically executing the exclusive controller at the user input apparatus based on the information about the exclusive controller.

The control method may further include: determining whether the exclusive controller exists in the user input apparatus; and switching the basic controller to the exclusive controller to control the application if it is determined that the exclusive controller exists in the user input apparatus.

The information about the exclusive controller may include information about whether the exclusive controller exists, an application ID, information about a version of the application, and information about a source from which to download the exclusive controller, and the control method further includes determining whether the exclusive controller exists in the user input apparatus, and downloading the exclusive controller based on the information about the source if it is determined the exclusive controller does not exist.

The information about the exclusive controller may include information about whether the exclusive controller exists, an application ID, information about a version of the application, and information about a source from which to download the exclusive controller, and the control method further includes updating the exclusive controller based on the application ID, the information about the version of the application, and the information about the source.

According to an aspect of another exemplary embodiment, there is provided an electronic device including: a communication unit that is configured to communicate with a user input apparatus; and an execution unit that automatically downloads the application based on information about an application received through the communication unit and executes the downloaded application.

The information about the application may include an application ID, information about a version of the application, and information about a source from which to download the application, and the execution unit downloads the application based on the information about the source.

The communication unit may receive information about pairing with the user input apparatus, and the execution unit performs pairing with the user input apparatus using the information about the pairing when executing the application.

According to an aspect of another exemplary embodiment, there is provided a user input apparatus including: a communication unit that is configured to communicate with an electronic device; an exclusive controller that controls an application executable in the electronic device; an information generation unit that generates information about the application; and a controller that controls the exclusive controller so that the user input apparatus is paired with the electronic device, controls the information generation unit to generate the information about the application when the user input apparatus is paired with the electronic device, and controls the communication unit to transmit the information about the application to the electronic device.

The information about the application may include an application ID, information about a version of the application, and information about a source from which to download the application.

The controller may transmit information about pairing with the electronic device to the electronic device.

According to an aspect of an exemplary embodiment, there is provided a control method of an electronic device, the control method including: receiving at the electronic device information about an application from a user input apparatus; automatically downloading the application based on the information about the application; and executing the downloaded application.

The information about the application may include an application ID, information about a version of the application, and information about a source from which to download the application, and the downloading the application downloads the application based on the information about the source.

The control method may further include: receiving information about pairing with the user input apparatus; and performing pairing with the user input apparatus using the information about the pairing when executing the application.

According to an aspect of another exemplary embodiment, there is provided a control method of a user input apparatus, the control method including: pairing the user input apparatus with an electronic apparatus; generating at the user input apparatus information about an application executable in the electronic device; and transmitting the information about the application from the user input apparatus to the electronic device.

The control method may further include transmitting information about pairing with the electronic device from the user input apparatus to the electronic device.

According to an aspect of another exemplary embodiment, there is provided a control method of an electronic device, the control method including: generating information about an exclusive controller that is executed in a user input apparatus and controls an application executed in the electronic; and transmitting the generated information about the exclusive controller from the electronic device to the user input apparatus.

The control method may further include transmitting information about pairing with the user input apparatus from the electronic device to the user input apparatus.

BRIEF DESCRIPTION OF THE DRAWINGS

The above and/or other aspects will become apparent and more readily appreciated from the following description of exemplary embodiments, taken in conjunction with the accompanying drawings, in which:

FIG. 7 is a flowchart illustrating a control method of the electronic device and the user input apparatus of FIG. 6 according to an exemplary embodiment.

DETAILED DESCRIPTION OF EXEMPLARY EMBODIMENTS

Figure 1:
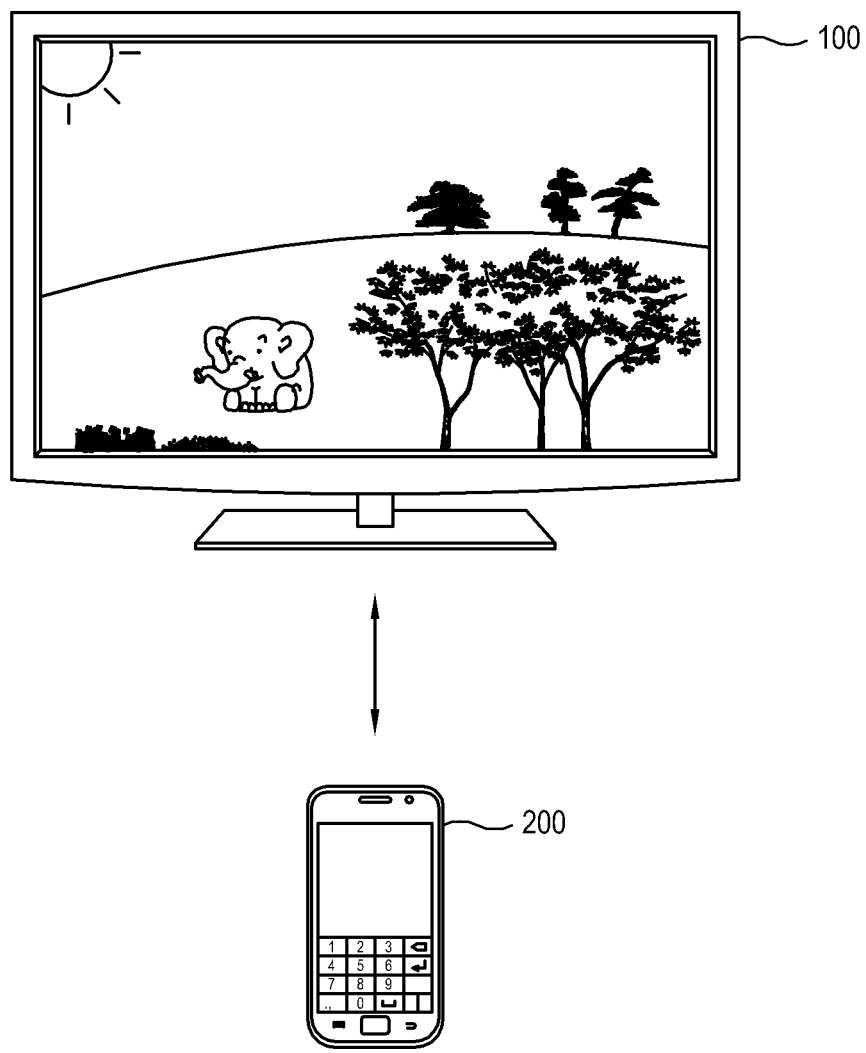
FIG. 1 shows an illustrative example of an electronic device and a user input apparatus controlling the same according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Figure 2:
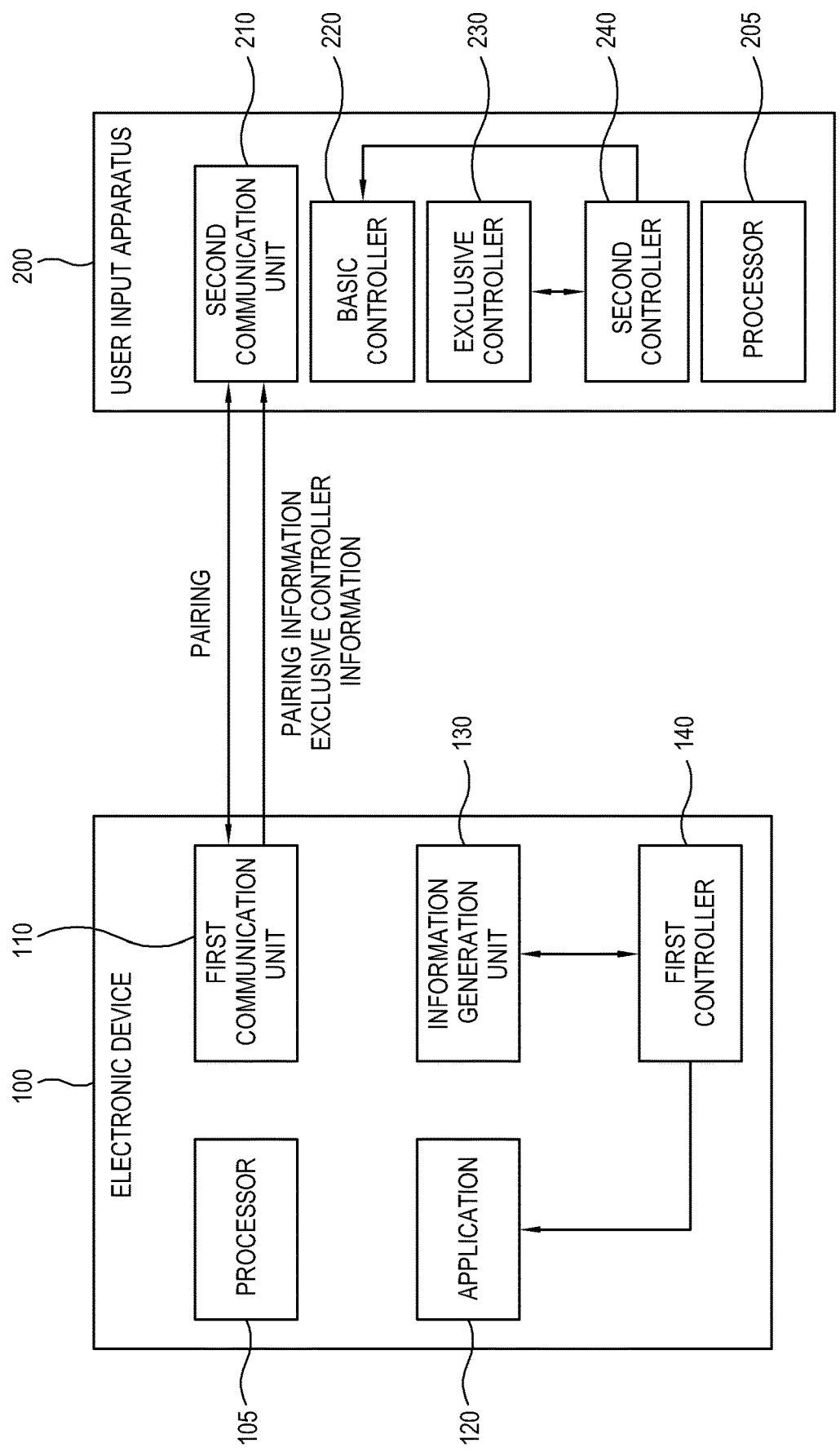
FIG. 2 is a block diagram of the electronic device and the user input apparatus of FIG. 1 according to an exemplary embodiment.

FIG. 1 shows an illustrative example of an electronic device and a user input apparatus controlling the same according to an exemplary embodiment, and FIG. 2 is a block diagram of the electronic device and the user input apparatus of FIG. 1 according to an exemplary embodiment.

As shown in FIG. 1, the electronic device 100 according to the present embodiment is configured as a display apparatus, such as a television (TV), which is capable of playing, executing, and displaying an application, e.g., a game, a video, a still image and/or an electronic book. Further, the electronic device 100 may also be configured as a monitor, a large format display (LFD), and a table top display (TTD) installed in a public place. The electronic device 100 includes a first communication unit 110, an application 120, an information generation unit 130, a first controller 140, and a hardware processor 105 configured to control and/or execute the first communication unit 110, the application 120, the information generation unit 130 and the first controller 140.

The user input apparatus 200 is configured as a mobile phone including a user interface which is configured to control an image displayed on the electronic device 100, that is, an application being executed. The user input apparatus 200 may include a keypad having direction buttons, number buttons, an enter button and a cancel button, or a user interface, such as a touch panel and a touch screen. The user input apparatus 200 may be configured as a remote control device, an additional display apparatus to realize a dual television set and various types of mobile devices, e.g., a personal digital assistant (PDA). The user input apparatus 200 includes a second communication unit 210, a basic controller 220, an exclusive controller 230, a second controller 240, and a hardware processor 205 to control and/or execute the second communication unit 210, the basic controller 220, the exclusive controller 230, and the second controller 240.

The first communication unit 110 performs pairing with the user input apparatus 200 according to control by the first controller 140 and communicates with the second communication unit 120. The first communication unit 110 and the second communication unit 210 may include a communication module corresponding to various communication modes and/or protocols, such as Bluetooth, Wi-Fi, Zigbee, infrared (IR) communication, radio frequency (RF) communication, and/or other cable communications. Middleware supporting home networking which allows sharing of digital contents, e.g., music, pictures and videos, stored in an electronic device such as a personal computer, house appliances and a portable terminal includes Universal Plug and Play (UPnP), Home Audio Video Interoperability (HaVi), Jini, VESA, digital living network alliance (DLNA), etc. The electronic device 100 and the user input apparatus 200 according to the present exemplary embodiment may communicate with each other according to DLAN guidelines built upon existing public standards, for example, HTTP, UPnP and Wi-Fi. The DLAN guidelines focus on sharing of all contents provided from devices including a TV, a VCR, a digital camera and an audio system and supports obtaining, transmitting, and managing a large number of digital media contents (e.g., pictures, music and videos) from personal devices such as a mobile device and a personal computer. The first communication unit 110 and the second communication unit 210 may transmit and receive images, user interface information, and various control signals through DLNA-based networking.

The application 120, which refers to software installed and executed in the electronic device 100, may be installed as a default in the electronic device 100 or be downloaded from an external server to the electronic device 100. As described above, the application 120 is configured as software for playing a game, a video, a still image, and/or an electronic book, and a user may perform various types of control while executing the application 120. For example, when the application 120 is game software, the user inputs various input signals using buttons to play a game. The application 120 is controlled according to input by the user, and various images changed accordingly are provided to the user.

The information generation unit 130 generates information about the exclusive controller 230 executed in the user input apparatus 200 to control the application 120. In the present exemplary embodiment, general control software for controlling the application 120 is defined as a basic controller, and software specifically designed for controlling a particular application 120 is defined as an exclusive controller. The basic controller performs basic control of moving an object using a direction key, adjusting sound volume, or executing and stopping an application. The basic controller is installed in the electronic device 100 as well, and the user may control an application using the basic controller installed in the electronic device 100. The exclusive controller may be provided in the user input apparatus 200 which controls the application 120, rather than in the electronic device 100.

When an application is executed, the information generation unit 130 generates exclusive controller information enabling identification of an exclusive controller corresponding to the application 120 through information included by the executed application 120. The exclusive controller information includes information about whether an exclusive controller for controlling the application exists, an application identifier (ID), information about a version of the application, and information about a source to download the exclusive controller from. Through information about whether there exists an exclusive controller corresponding to the application 120 and information enabling identification of the application 120, the exclusive controller 230 corresponding to the application 120 is determined. The exclusive controller information is transmitted to the user input apparatus 200 by the first communication unit 110.

When the electronic device 100 is paired with the user input apparatus 200, the first controller 140 controls the information generation unit 130 to generate exclusive controller information and controls the first communication unit 110 to transmit the generated exclusive controller information to the user input apparatus 200. Further, when the application 120 is controlled by the exclusive controller 230 of the user input apparatus 200, the first controller 140 further transmits information about pairing with the user input apparatus 200 to the user input apparatus 200. The pairing information may include information about matching of the electronic device 100 with the user input apparatus 200 and a media access control (MAC) address and denotes unique information for communication between devices. When an application or software controls a particular device, pairing is generally carried out whenever a new application or software is executed.

The second communication unit 210 performs pairing with the electronic device 100 and communicates with the electronic device 100 according to control by the second controller 240.

The basic controller 220 refers to general software that is configured to control and execute the application 120 installed in the electronic device 100. In the present exemplary embodiment, the user executes the basic controller 220 to start running the application 120.

The exclusive controller 230 refers to a control program which not only has a function of the basic controller 220 but also controls a particular application. That is, the application 120 and the exclusive controller 230 are configured to identify each other. As described above, the exclusive controller 230 may be installed in the user input apparatus 200 or may be downloaded and/or updated through an external server connected to the user input apparatus 200 through a network. If both of the exclusive controller 230 and the basic controller 220 are installed in the user input apparatus 200, the application 120 may be controlled by either of the exclusive controller 230 and the basic controller 220. In the present exemplary embodiment, the exclusive controller 230 is automatically executed.

The second controller 240 receives exclusive controller information about the exclusive controller 230 controlling the application 120 through the second communication unit 210 and automatically executes the exclusive controller 230 based on the exclusive controller information. When the exclusive controller information is received while the basic controller 220 is running, the second controller 240 automatically switches a controller for controlling the application 120 from the basic controller 220 to the exclusive controller 230. When the controller is switched to the exclusive controller 230, the electronic device 100 is controlled by the new controller, not by the previous basic controller 220, and thus it is needed to newly pair the exclusive controller 230 with the electronic device 100. When running the exclusive controller 230, the second controller 240 performs pairing of the electronic device 100 with the exclusive controller 230 using the pairing information.

According to a related art method, a process of identifying whether there exists an exclusive controller needed for an electronic device, a process of obtaining information about the exclusive controller if the exclusive controller exists, and a process of running the exclusive controller and newly pairing the electronic device and a user input apparatus for the execution are entirely carried out by user's input. On the other hand, in the present exemplary embodiment, the electronic device 100 and the user input apparatus 200 automatically perform the entire foregoing processes through network communication. Once a user selects execution of the application 120, the exclusive controller 230 is selected and executed, thereby performing optimal and convenient control for the application 120.

In another exemplary embodiment, the user may change the foregoing processes automatically performed to manual processes or be provided with a graphic interface to identify the exclusive controller information or pairing information while transmitting the information. The second controller 240 may generate and display a graphic interface to ask the user about a selection whenever the processes are changed.

Alternatively, when the user does not desire to change the basic controller 220 to the exclusive controller 230, the second controller 240 may provide the user with a graphic interface to select the exclusive controller 230.

Figure 3:
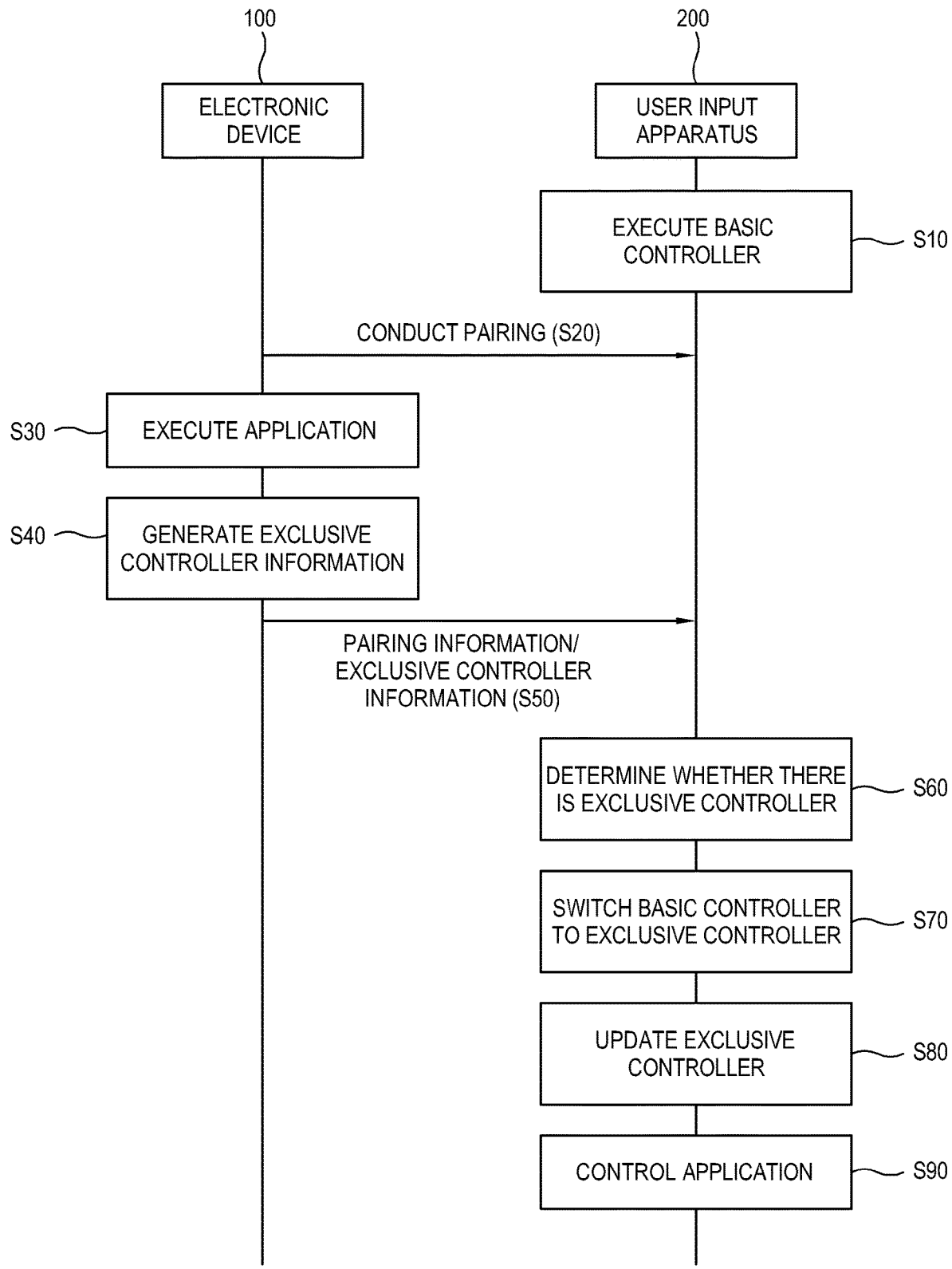
FIG. 3 is a flowchart illustrating a control method of the electronic device and the user input apparatus of FIG. 1 according to an exemplary embodiment.

FIG. 3 is a flowchart illustrating a control method of the electronic device and the user input apparatus of FIG. 1 according to an exemplary embodiment. A process of the user input apparatus 200 controlling the application 120 is described as follows with reference to FIG. 3.

First, a user executes the basic controller 220 of the user input apparatus 200 (S10) to conduct pairing of the user input apparatus 200 with the electronic device 100 (S20).

After pairing the user input apparatus 200 with the electronic device 100, the user executes the application 120 through the basic controller 220 (S30).

The information generation unit 130 of the electronic device 100 generates information about an exclusive controller from the application 120 (S40). The information about the exclusive controller includes information about whether there is the exclusive controller, an application ID, information about a version of the application, and information about a source from which to download the exclusive controller 230. The generated information about the exclusive controller is transmitted along with pairing information to the user input apparatus 200 (S50).

The second controller 240 of the user input apparatus 200 determines whether there is an exclusive controller corresponding to the received information about the exclusive controller (S60).

If it is determined that the exclusive controller 230 exists, the second controller 240 switches the basic controller 220 to the exclusive controller 230 to control the application 120 (S70).

In this process, pairing the electronic device 100 with the exclusive controller 230 is realized based on the pairing information such as information about matching of the electronic device 100 with the user input apparatus 200 and an MAC address, without further setting or selection by the user.

Additionally, the second controller 240 may update the exclusive controller 230 based on the application ID, the information about the version of the application, and the information about the source (S80). The source information may include a web address to download the exclusive controller 230. The second controller 240 may identify a version of the exclusive controller 230 through the information about the version of the application, and may download an up-to-date exclusive controller 230 using the source information if the current exclusive controller 230 is not a latest version.

The user executes the exclusive controller 20 to control the application 120 (S90).

According to another exemplary embodiment, the user may execute the application 120 in the electronic device 100, rather than in the user input apparatus 200. In this case, the information about the exclusive controller and the pairing information are transmitted from the electronic device 100 to the user input apparatus 200 as well, and the user may control the application 120 using the user input apparatus 200 without additional selection.

Figure 4:
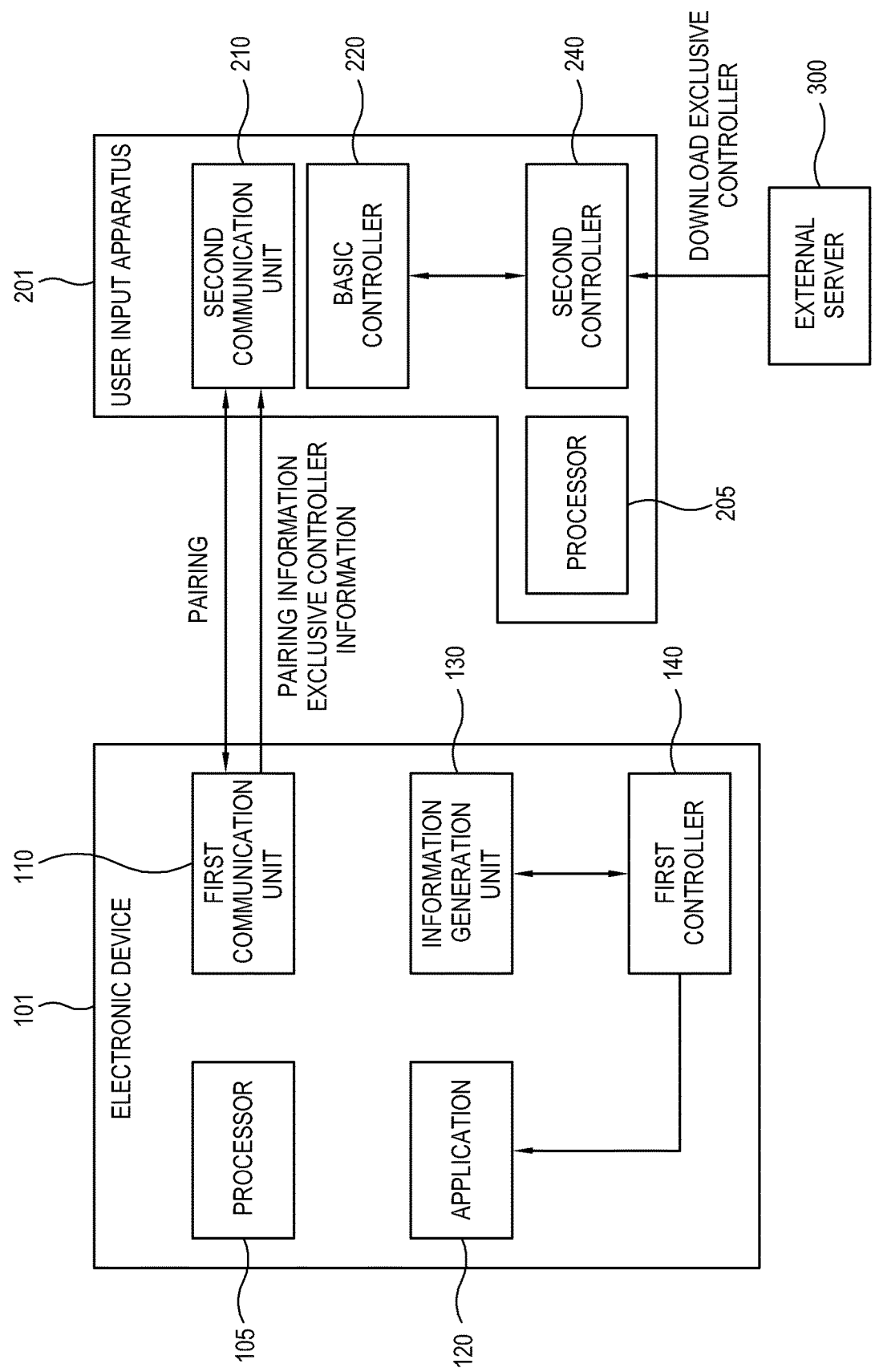
FIG. 4 is a block diagram of an electronic device and a user input apparatus according to another exemplary embodiment.

FIG. 4 is a block diagram of an electronic device and a user input apparatus according to another exemplary embodiment. As shown in FIG. 4, a user input apparatus 201 according to the present exemplary embodiment does not include an exclusive controller.

The user input apparatus 201 receives information about an exclusive controller from an electronic device 101, such as information about whether there is an exclusive controller, an application ID, information about a version of an application, and information about a source from which to download the exclusive controller, and determines whether there is an exclusive controller in the user input apparatus 201. If it is determined that an exclusive controller does not exist, a second controller 240 downloads an exclusive controller from an external server 300 based on the information about the source.

According to a related art method, in order to download a particular application or software to a device, it is necessary to access a website to download the application from, for example, an application market site, to search for the application, to download and execute the retrieved application. Further, it is also necessary to perform new pairing of the downloaded application with an electronic device to be controlled.

The user input apparatus 201 according to the present exemplary embodiment allows automatic retrieving, downloading and executing an exclusive controller in order to solve such inconvenience and to control an application 120 in optimal conditions.

Figure 5:
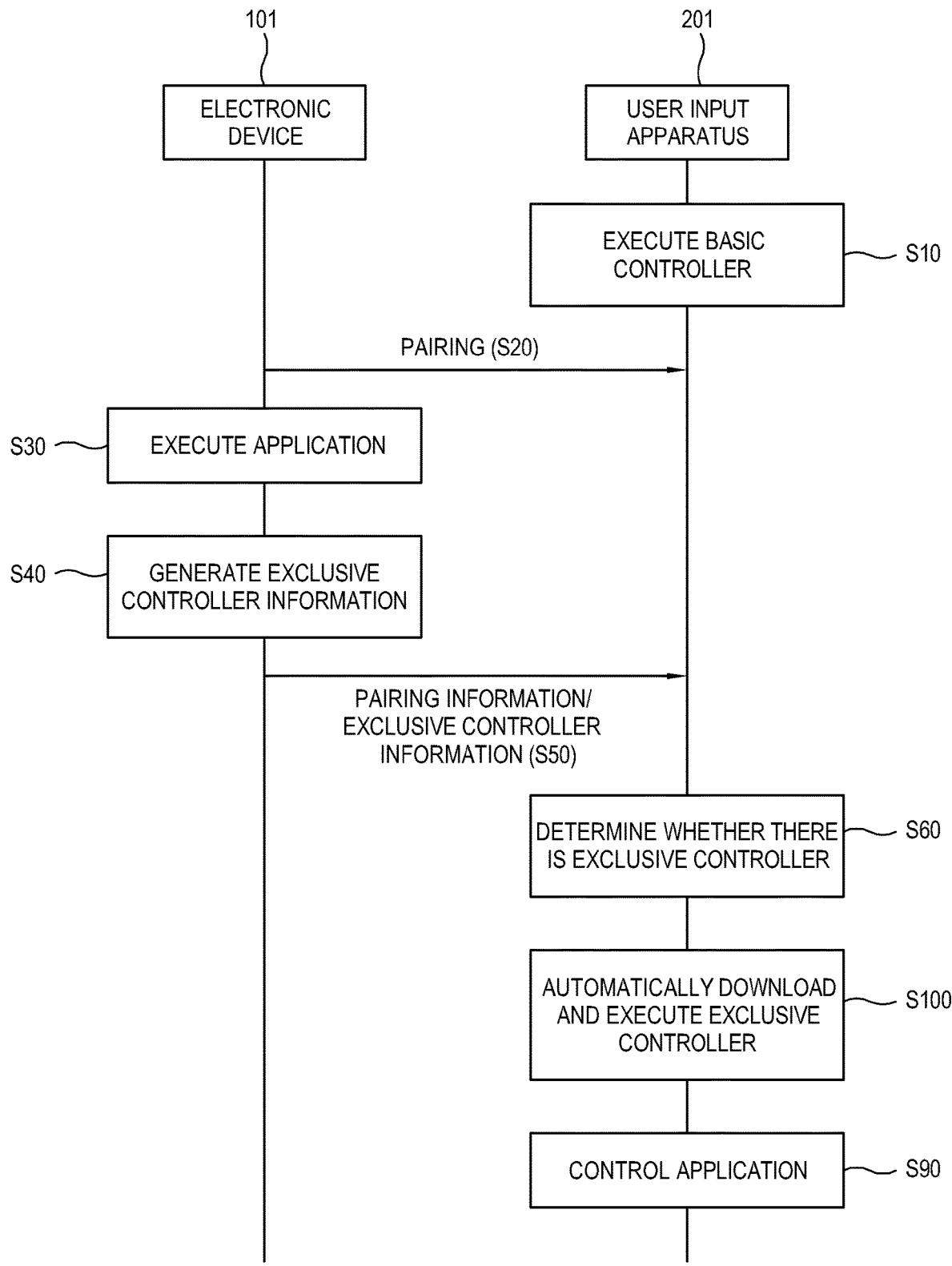
FIG. 5 is a flowchart illustrating a control method of the electronic device and the user input apparatus of FIG. 4 according to an exemplary embodiment.

FIG. 5 is a flowchart illustrating a control method of the electronic device and the user input apparatus of FIG. 4 according to an exemplary embodiment. A process of the user input apparatus 201 controlling the application 120 is described as follows with reference to FIG. 5.

As shown in FIG. 5, processes of executing a basic controller 220 (S10) and of pairing the electronic device 101 with the user input apparatus 201 (S20), a process of executing the application 120 through the basic controller 220 (S30), a process of generating information about an exclusive controller (S40), a process of transmitting the information about the exclusive controller along with pairing information to the user input apparatus 201 (S50), and a process of the second controller 240 of the user input apparatus 201 determining whether there is an exclusive controller corresponding to the exclusive controller information (S60) are similar to or substantially the same as in the above exemplary embodiment with reference to FIG. 3.

If it is determined that an exclusive controller does not exist in the user input apparatus 201, the second controller 240 automatically downloads and executes an exclusive controller using source information of the exclusive controller information (S100).

The downloaded exclusive controller is automatically paired with the electronic device 101, and a user may control the application 120 of the electronic device 101 using the exclusive controller (S90).

Figure 6:
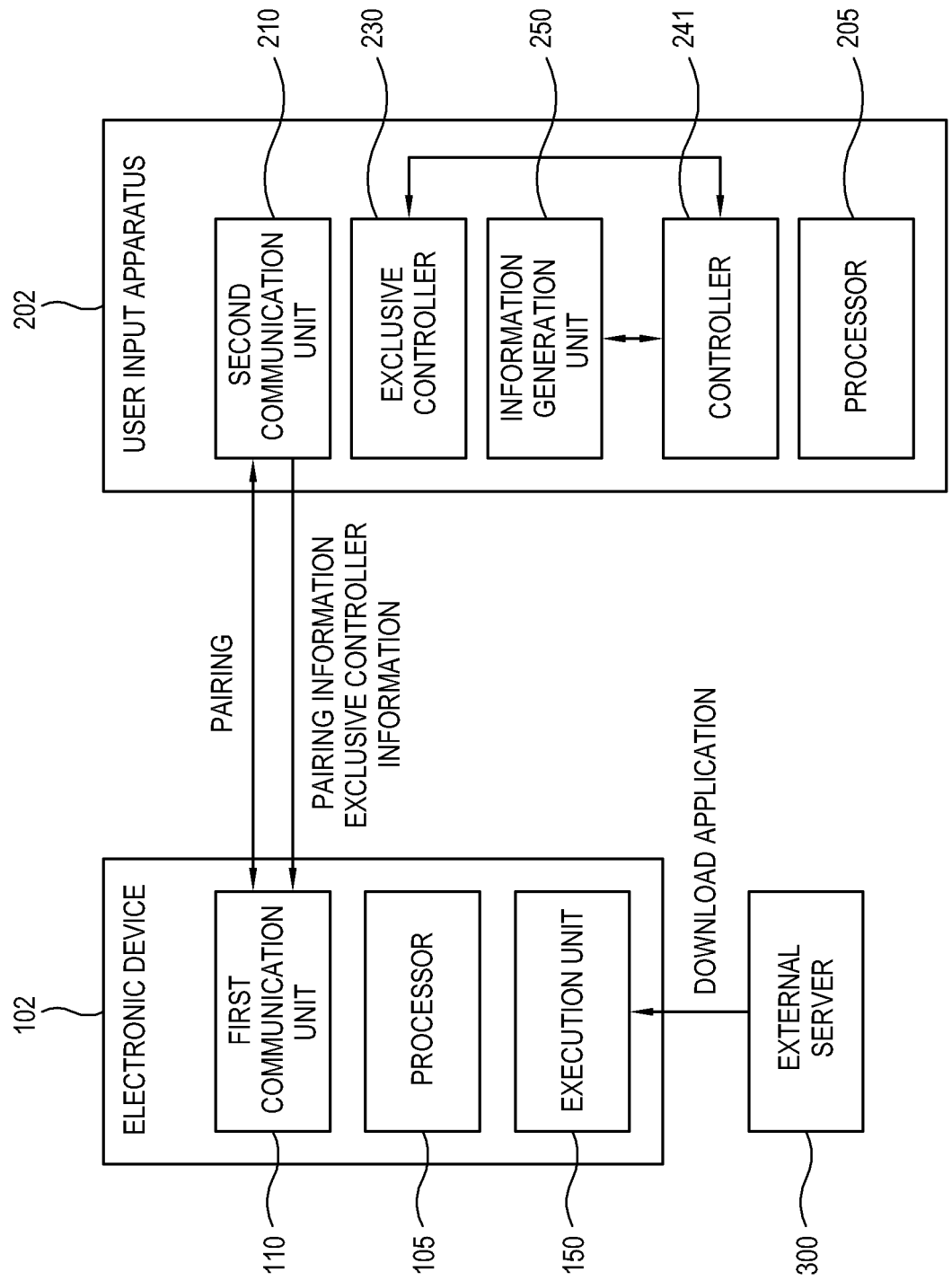
FIG. 6 is a block diagram of an electronic device and a user input apparatus according to still another exemplary embodiment.

FIG. 6 is a block diagram of an electronic device and a user input apparatus according to still another exemplary embodiment.

As shown in FIG. 6, an electronic device 102 includes a first communication unit 110, an execution unit 150, and a hardware processor 105 configured to control and/or execute the first communication unit 110 and the execution unit. The user input apparatus 202 includes a second communication unit 210, an exclusive controller 230, an information generation unit 250, a controller 241, and a hardware processor 205 to control and/or execute the second communication unit 210, the exclusive controller 230, the information generation unit 250, and the controller 241. An application is not installed in the electronic device 102, and the exclusive controller 230 is installed in a user input apparatus 202. The user input apparatus 202 according to the present exemplary embodiment determines whether there is an application corresponding to the exclusive controller 230 using the exclusive controller 230, and controls the electronic device 102 to download and execute the application if there is no application in the electronic device 102.

The first communication unit 110 and the second communication unit 210 are similar to or substantially the same as those in the foregoing exemplary embodiments.

The exclusive controller 230 of the user input apparatus 202 is software controlling an application executable in the electronic device 102, and the exclusive controller 230 includes information about identification of an application controlled by the exclusive controller 230.

The information generation unit 250 generates information about an application using the information obtained through the exclusive controller 230. The application information may include an application ID, information about a version of an application, and information about a source to download an application from.

The controller 241 controls the exclusive controller 230 to be paired with the electronic device 102, controls the information generation unit 250 to generate application information when the exclusive controller 230 is paired with the electronic device 102, and controls the second communication unit 210 to transmit the application information to the electronic device 102. The controller 241 further transmits information about pairing with the electronic device 102 together with the application information to the electronic device 102. The pairing information enables the exclusive controller 230 to control the application without an additional pairing process when the application is controlled by the exclusive controller 230.

The execution unit 150 of the electronic device 102 automatically downloads the application based on the application information received through the first communication unit 110 and executes the downloaded application. The electronic device 102 may download and update the application through communication with an external server 300.

Alternatively, the application may be installed in the electronic device 102 and automatically retrieved, executed, and controlled by the exclusive controller 230 of the user input apparatus 202. That is, the application may be automatically controlled by an exclusive controller, rather than by a basic controller. In this case, information about identification of the application included in the exclusive controller is used.

FIG. 7 is a flowchart illustrating a control method of the electronic device and the user input apparatus of FIG. 6 according to an exemplary embodiment. A process of executing an application according to the present exemplary embodiment is described with reference to FIG. 7.

A user executes the exclusive controller 230 of the user input apparatus 202 (S110).

In this process, the electronic device 102 is paired with the user input apparatus 202 (S20), and the information generation unit 250 generates information about an application controlled by the exclusive controller 230 (S120).

The generated application information and pairing information are transmitted to the electronic device 102 through the second communication unit 210 (S130).

The execution unit 150 of the electronic device 102 determines whether there is an application corresponding to the transmitted application information (S140). If it is determined that there is no application, an application is automatically downloaded based on the application information and executed (S150).

Then, the application of the electronic device 100 is controlled by the exclusive controller 230 (S90).

As described above, one exemplary embodiment provides an electronic device which is configured to readily execute an exclusive controller controlling an application without additional selection by a user, a user input apparatus controlling the same, and a control method thereof.

Another exemplary embodiment also provides an electronic device which is configured to easily update and install an exclusive controller controlling an application without additional selection by a user, a user input apparatus controlling the same, and a control method thereof.

In addition, still another exemplary embodiment provides an electronic device which is configured to readily install and execute an application controlled by an exclusive controller controlling without additional selection by a user, a user input apparatus controlling the same, and a control method thereof.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. An electronic device comprising:
a communicator comprising a circuit configured to communicate with an external apparatus;
a display; and
a processor configured to:
based on a first user input being received, execute a first application selected according to the received first user input from among a plurality of first applications, which is applicable in the electronic device and different from each other,
control the display to change an image displayed on the display with respect to the first application to correspond to a second application executed in and displayed on the external apparatus, based on a second user input being received,
identify, based on information regarding the executed first application, information regarding the second application, which corresponds to the executed first application, and
control the communicator to transmit the identified information regarding the second application to the external apparatus for executing the second application.

2. The electronic device of claim 1, wherein the first user input and the second user input are received from the external apparatus.

3. The electronic device of claim 1, wherein the plurality of first applications comprises a plurality of software, which provides contents that are different from each other.

4. The electronic device of claim 1, wherein a graphical user interface (GUI) of the first application is replaced with a GUI of the second application when the second application is executed at the external apparatus.

5. The electronic device of claim 1, wherein the second application is configured to be executed at the external apparatus to control the first application from the external apparatus, and
the information regarding the second application comprises information about whether the second application exists that controls the first application, an application identifier for the second application, information about a version of the second application, and information about a source from which to download the second application.

6. The electronic device of claim 1, wherein the processor is further configured to control the communicator to transmit information about connecting in communication with the external apparatus to the external apparatus.

7. A user input apparatus comprising:
a communicator comprising a circuit configured to communicate with an electronic device;
a display; and
a processor configured to:
control the communicator to transmit a first control signal relating to a first user input to the electronic device to execute a first application from among a plurality of first applications in the electronic device, the plurality of first applications being applicable in the electronic device and different from each other,
control the communicator to receive, from the electronic device, information regarding a second application, which corresponds to the executed first application and is generated at the electronic device,
execute the second application in the user input apparatus to be displayed on the display based on the received information, and
transmit a second control signal relating to a second user input in the executed second application to the electronic device, so that the electronic device changes an image displayed with respect to the first application to correspond to the second application displayed on the user input apparatus based on the transmitted second control signal.

8. The user input apparatus of claim 7, wherein the plurality of first applications comprises a plurality of software, which provides contents that are different from each other.

9. The user input apparatus of claim 7, wherein the processor is further configured to control, using a basic control application, the communicator.

10. The user input apparatus of claim 9, wherein the processor is further configured to:
based on the information about the second application being received, automatically execute the second application based on the received information about the second application to control the first application, and
the processor is further configured to:
control the communicator to connect in communication with the electronic device through the basic control application,
identify whether the second application exists in the user input apparatus when the information about the second application is received, and
switch the basic control application to the second application to control the first application if it is identified that the second application exists.

11. The user input apparatus of claim 10, wherein the information about the second application comprises information about whether the second application exists that controls the first application, an application identifier of the second application, information about a version of the second application, and information about a source from which to download the second application, and
the processor is further configured to identify whether the second application exists in the user input apparatus, and downloads the second application based on the information about the source if it is identified that the second application does not exist in the user input apparatus.

12. The user input apparatus of claim 10, wherein the information about the second application comprises information about whether the second application exists that controls the first application, an application identifier of the second application, information about a version of the second application, and information about a source from which to download the second application, and the processor is further configured to update the second application based on the application identifier, the information about the version of the second application, and the information about the source.

13. The user input apparatus of claim 7, wherein the communicator is configured to receive, from the electronic device, information about connecting the second application of the user input apparatus with the electronic device, and the processor is further configured to conduct connecting in communication with the electronic device using the information about the connecting the second application of the user input apparatus with the electronic device when executing the second application.

14. A control method of a user input apparatus comprising:

connecting the user input apparatus in communication with an electronic device;

controlling to transmit a first control signal relating to a first user input to the electronic device to execute a first application from among a plurality of first applications in the electronic device, the plurality of first applications being applicable in the electronic device and different from each other;

controlling to receive, from the electronic device, information regarding a second application, which corresponds to the executed first application and is generated at the electronic device, to execute the second application in the user input apparatus; and transmitting a second control signal relating to a second user input in the executed second application to the electronic device based on the received information, so that the electronic device changes an image displayed with respect to the first application to correspond to the second application executed in the user input apparatus based on the transmitted second control signal.

15. The control method of claim 14, wherein the plurality of first applications comprises a plurality of software, which provides contents that are different from each other.

16. The control method of claim 14, wherein the connecting the user input apparatus comprises connecting the user input apparatus in communication with the electronic device through a basic control application of the user input apparatus.

17. The control method of claim 14, further comprising:

based on the information about the second application being received, automatically executing the second application based on the received information about the second application to control the first application, wherein the executing the second application comprises:

identifying whether the second application exists in the user input apparatus; and switching the first application to the second application to control the first application if it is identified that the second application that controls the first application exists in the user input apparatus.

18. The control method of claim 17, wherein the information about the second application comprises information about whether the second application exists that controls the first application, an application identifier of the second application, information about a version of the second application, and information about a source from which to download the second application, the control method further comprising:

identifying whether the second application exists in the user input apparatus; and downloading the second application based on the information about the source if it is identified that the second application does not exist.

19. The control method of claim 17, wherein the information about the second application comprises information about whether the second application exists that controls the first application, an application identifier, information about a version of the second application, and information about a source from which to download the second application, the control method further comprising updating the second application based on the application identifier, the information about the version of the second application, and the information about the source.

20. An electronic device configured to execute a first application and controllable by a user input apparatus receiving a user input, the electronic device comprising:

a communicator comprising a circuit configured to communicate with the user input apparatus;

a display; and a processor configured to:

in response to a first user input being received from the user input apparatus, control the display to change an image displayed with respect to the first application to correspond to a second application executed in the user input apparatus, and in response to information being received from the user input apparatus which executes a pre-designated control application, change the image displayed with respect to the first application to correspond to the pre-designated control application executed in the user input apparatus, wherein the information is generated by the user input apparatus in response to a second user input at the user input apparatus, the information is about the first application that is controlled by the pre-designated control application, and the information about the first application is generated at the user input apparatus using information about identification of the first application included in the pre-designated control application.

21. The electronic device of claim 20, wherein the processor is configured to:

in response to the first user input being received from the user input apparatus in which a basic control application is executed, control the display to change an image displayed with respect to the first application to correspond to the basic control application executed in the user input apparatus.

22. The electronic device of claim 21, wherein the information about the first application comprises an application identifier, information about a version of the first application, and information about a source from which to download the first application, and the processor is configured to download the first application based on the information about the source and executes the downloaded first application.

23. The electronic device of claim 21, wherein the communicator receives information about connecting the pre-designated control application of the user input apparatus with the electronic device, and the processor is configured to perform connecting in communication with the user input apparatus using the information about the connecting the pre-designated control application of the user input apparatus with the electronic device when executing the first application.

24. A control method of an electronic device configured to execute a first application, and controllable by a user input apparatus configured to receive a user input, the control method comprising:
- receiving the user input from the user input apparatus in which a basic control application is executed;
- executing the first application according to the received user input;
- generating, using information regarding the executed first application, at the electronic device, information about a pre-designated control application for controlling the executed first application, wherein the pre-designated control application is configured to be executed in the user input apparatus;
- transmitting the information about the pre-designated control application from the electronic device to the user input apparatus, wherein the first application is controlled by the pre-designated control application when the pre-designated control application is executed in the user input apparatus based on the transmitted information; and
- changing an image displayed with respect to the first application to correspond to the pre-designated control application executed in the user input apparatus based on the user input being received from the user input apparatus.

25. The control method of claim 24, further comprising transmitting information about connecting in communication with the user input apparatus from the electronic device to the user input apparatus.

* * * * *